(12) United States Patent
Anpilov et al.

(10) Patent No.: US 9,550,676 B2
(45) Date of Patent: Jan. 24, 2017

(54) METHOD FOR PRODUCING A COLLOIDAL SOLUTION OF NANOSCALE CARBON

(71) Applicant: OBSCHESTVO S OGRANICHENNOY OTVETSTVENNOSTYU "PLASMA-SK", G. Saratov (RU)

(72) Inventors: Andrey Mitrofanovich Anpilov, Moscow (RU); Eduard Mikhaylovich Barkhudarov, Moscow (RU); Igor'Antonovich Kossyj, Moscow (RU); Mamikon Aramovich Misakyan, g. Klin (RU)

(73) Assignee: OBSCHESTVO S OGRANICHENNOY OTVETSTVENNOSTYU "PLAZMA-SK", G. Saratov (RU)

( * ) Notice: Subject to any disclaimer, the term of this patent is extended or adjusted under 35 U.S.C. 154(b) by 0 days.

(21) Appl. No.: 14/899,253

(22) PCT Filed: Jun. 19, 2013

(86) PCT No.: PCT/RU2013/000519
§ 371 (c)(1),
(2) Date: Dec. 17, 2015

(87) PCT Pub. No.: WO2014/204340
PCT Pub. Date: Dec. 24, 2014

(65) Prior Publication Data
US 2016/0159650 A1    Jun. 9, 2016

(51) Int. Cl.
C01B 31/02 (2006.01)
B01J 13/00 (2006.01)
B82Y 40/00 (2011.01)

(52) U.S. Cl.
CPC ........ *C01B 31/0206* (2013.01); *B01J 13/0026* (2013.01); *B82Y 40/00* (2013.01)

(58) Field of Classification Search
CPC .... C01B 31/0206; B82Y 40/00; B01J 13/0026
See application file for complete search history.

(56) References Cited

PUBLICATIONS

Chen et al., "Microplasma discharge in ethanol solution: Characterization and its application to the synthesis of carbon microstructures", Thin Solid Films 516 (2008) 4435-4440.*

* cited by examiner

*Primary Examiner* — Kishor Mayekar
(74) *Attorney, Agent, or Firm* — Birch, Stewart, Kolasch & Birch, LLP

(57) ABSTRACT

The technical result of the present method is simplicity, low cost and the possibility of producing nanoparticles of different types. This result is achieved in that the method for producing a colloidal solution of nanoscale carbon is carried out as follows: an organic fluid is fed into a chamber that contains electrodes, an inert gas is injected into the interelectrode space, a high temperature plasma channel is formed in gas bubbles, thus atomizing ethanol molecules, followed by rapid cooling.

4 Claims, 1 Drawing Sheet

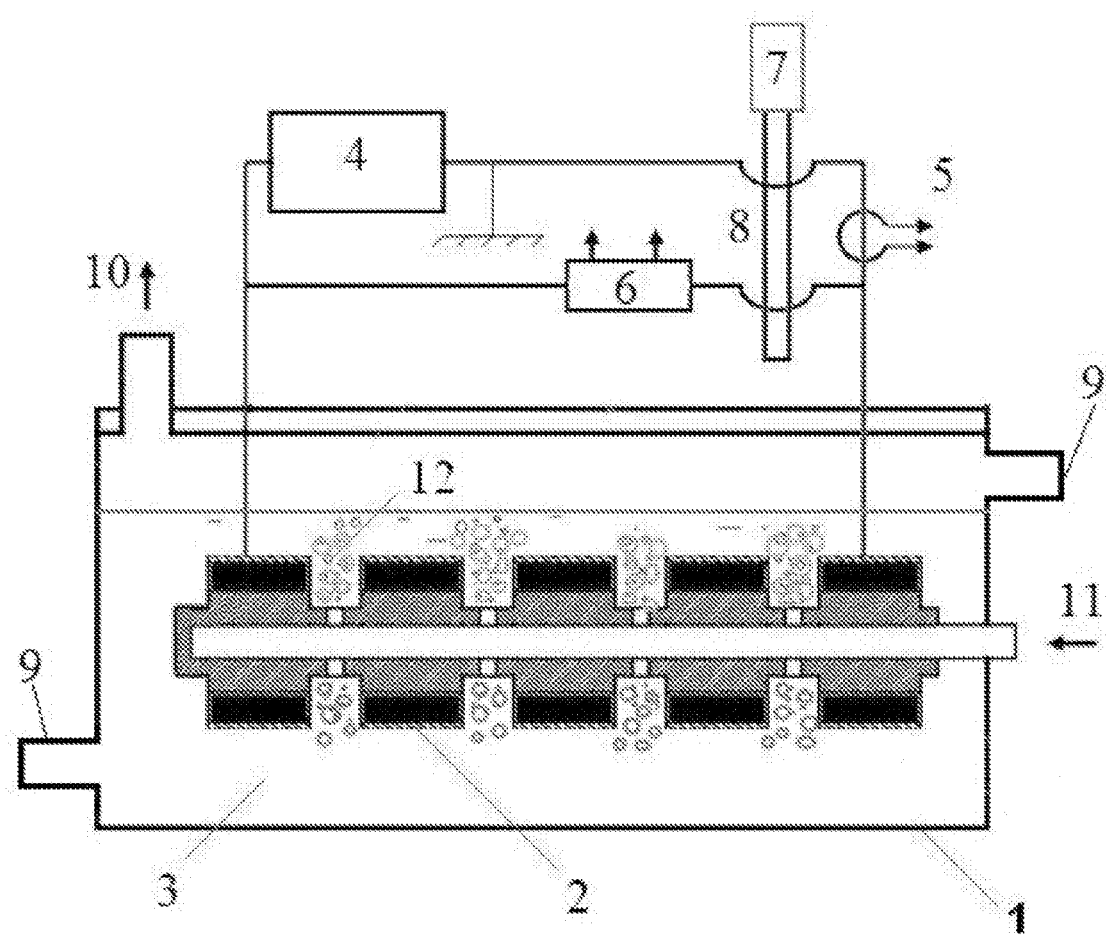

METHOD FOR PRODUCING A COLLOIDAL SOLUTION OF NANOSCALE CARBON

BACKGROUND OF THE INVENTION

The provided method for producing a stable colloidal solution of nanoscale carbon relates to the field of nanotechnology.

PRIOR ART

Preparation and study of nanostructured materials is of great interest from the scientific and applied points of view (the unique electrical, magnetic, chemical, mechanical, fluorescent properties, catalytic activity, etc.).

The fundamental interest is associated with structural characteristics and physical and chemical characteristics of a subject matter (a large amount of free carbon bonds, compact structure).

The study of such properties of nanofluids, as the thermal conductivity, density, viscosity, conductivity, optical and magnetic properties is of great interest.

The unusual properties of the nanoparticles are the basis for a variety of applied research areas:
  advanced materials technology, pharmacology;
  unique source of field electron emission;
  metallic and semiconducting characteristics of the most miniature electronic devices;
  surface structure of the subject matter allows you to use it as a container for liquids and gases, such as hydrogen.

Recently, considerable interest is drawn to works related to the production of thin films of nanostructured carbon for reducing the coefficient of secondary emission of metals and dielectrics, growing diamond films and glass, preparation of stable colloidal solutions (absorbers of solar energy) (Robert Taylor, Sylvain Coulombe, Todd Otanicar, Patrick Phelan, Andrey Gunawan4, Wei Lv4, Gary Rosengarten, Ravi Prasher, and Himanshu Tyagi. Small particles, big impacts: A review of the diverse applications of nanofluids. J. Appl. Phys. 113, 011301 (2013).

There are various methods (physical, chemical, combined and other) for forming nanoparticles:
  electric arc,
  repetitively pulsed arc and spark,
  laser ablation in liquids and gases,
  deposition of chemical reaction products,
  pyrolysis in the presence of metal catalysts,
  electric explosion of conductors,
  catalytic transformation of composite powders in flames, etc.

However, most of said methods are time-consuming, costly and complicated, typically they require isolation of the useful product from impurities. Carbon nanostructures are metastable states of condensed carbon, they can be obtained only in cases of deviations from the thermodynamic equilibrium. Therefore, a great interest arose to a number of recent studies in which pulsed electrical discharge in liquids is used to synthetize the nanoparticles of carbon, metals and various compositions. A short pulsed discharge helps to form metastable phases of carbon as a result of organic ethanol molecules atomization in the high temperature discharge channel and its subsequent rapid cooling ("quenching").

The method is considered promising because of a number of features:
  simplicity and low cost of installations and feed materials;
  possibility of scaling the synthesis;
  possibility of obtaining different types of nanoparticles;
  liquid surrounding plasma restricts its expansion and increases temperature and pressure, which favors the exothermic chemical reactions.

The pulsed electric discharge in a liquid can be realized in two ways. In one case, the pulse energy shall be ≥1 kJ, while in the second case it does not exceed few joules. The first case requires rather bulky and complex equipment, the reactor is subjected to considerable shock loads. Moreover, particles of from micron to nanometer scale are thus obtained, and it requires additional efforts to separate them by using different technologies. Graphite electrodes are a source of carbon in such a liquid as water. When an organic liquid is used it becomes a source of carbon.

Study results of the carbon nanoparticle synthesis in organic liquids, in particular in ethanol, are presented in the article (Journal of Physics D: Applied Physics, 43 (32). P. 323001. Mariotti, D and Sankaran, R M (2010) Microplasmas for nanomaterials synthesis).

The closest to the present method is the method described in the article (Pulsed discharge production of nano- and microparticles in ethanol and their characterization. Parkansky N., Alterkop B., Boxman R L, Goldsmith S., Barkay Z., Lereah Y. Powder Technology. 2005. T. 150. No. 1. pp 36-41), wherein the pulsed arc discharge in ethanol is used. Two electrodes are placed in ethanol (graphite, nickel, tungsten, etc.), the pulse repetition frequency is f=100 Hz, currents and voltage are I=100-200 A, U=20 V, respectively, the pulse duration is τ=30 µs, the particles of from nanometer to micron scale are thus formed.

The drawback of this method is the instability of the colloidal solution (quite rapid precipitation), wide range of particle size, as well as a rather complicated procedure of electrical breakdown in ethanol.

BRIEF DESCRIPTION OF THE INVENTION

The technical result of the invention is the simplicity and low cost, the possibility to obtain different types of the nanoparticles. Moreover, the following advantages of the present technical solutions should be noted:
  Multi-electrode high voltage pulse discharge with injection of an inert gas in the inter-electrode space enables to form the stable nanostructured colloidal solution in ethanol. There is a certain threshold of the specific energy deposition (J/cm$^3$) above which the colloidal solution becomes stable and the properties of the solution does not change for more than one year.
  At lower specific energy depositions, precipitation and the liquid clarification occur during 2-3 days.
  If the solution is heated close to the boiling point and then cooled, the colloid properties do not change.
  When current passes through the colloidal solution (electrophoresis), rapid precipitation and liquid clarification occur. Simultaneously, the nanostructured carbon film is formed at the positive electrode.
  The nanoparticle sizes depend on the specific energy deposition. Near the threshold specific energy deposition the size is from 5 to 10 nm and they have the form of disordered carbon.
  The nanopowder can be isolated from the colloidal solution by evaporation, or as a result of electrophoresis.

The technical result is achieved by the method for producing the colloidal solution of nanoscale carbon is carried out as follows: the organic liquid is fed into the chamber containing the electrodes, the inert gas is injected into the inter-electrode space, the high temperature plasma channel is formed in gas bubbles, thus atomizing ethanol molecules, followed by rapid cooling.

If the threshold of the specific energy deposition in the liquid is exceeded, the stable colloidal solution is formed.

Ethanol can be used as the organic liquid.

BRIEF DESCRIPTION OF DRAWINGS

The drawing shows a device for obtaining the colloidal solution.

EMBODIMENTS OF THE INVENTION

The present method for producing the stable colloidal solution of nanoscale carbon is based on implementing the pulsed high voltage discharge in the bubbles of the inert gas injected into the organic liquid (ethanol). As noted above, the feature of the pulsed discharges in ethanol is ethanol molecules atomization in the high temperature channel followed by rapid cooling. Use of a high voltage multielectrode discharge device with gas injection into the inter-electrode space by virtue of a special formation of the plasma channel and its cooling opens up new possibilities for the production of nanostructures, carbon nanofluids.

They use the dielectric chamber 1, the multi-electrode discharge device 2 wherein the gas is injected in the inter-electrode space being inside the chamber placed in ethanol 3 which partially fills the chamber. The chamber 1 is provided with a device for gas injection, system for filling and flushing the organic liquid (ethanol). The discharge device is connected to the high-voltage pulse generator 4. The device includes the pulse generator 4, the Rogowski coil 5, the voltage divider 6, the spectrograph 7, the optical waveguide 8, the pipes for flushing liquid 9, the gas vent pipe 10.

The device operates as follows.

The inert gas is injected into the discharge device 2 through the pipe 11. The pipe 10 is used to remove it from the reactor. After that reactor 1 is partially filled with the liquid to cover the discharge device 2 fully. A high voltage with the set value (U≤20 kV) and the pulse repetition frequency (f≤100 Hz) is supplied to the end electrodes of the discharge device. If the reactor is operated in a continuous mode, then the pipes 9 provide the necessary liquid flow rate. The pulsed discharge appears in the gas bubbles 12 filled with the alcohol vapor. The high-temperature plasma channel is formed in each of the inter-electrode spaces, it lasts for a few microseconds and has the following parameters: the temperature of heavy particles is T=4,000-5,000 K, the electron temperature is Te=1-1.5 eV, the concentration of charged particles n=(2-3)·10$^{17}$ cm$^3$, the diameter of the plasma channel is hundreds of microns. The single pulse energy deposition is ≤1.6 J.

Atomization of ethanol molecules occurs in the plasma channel. As a result of subsequent rapid cooling ("quenching"), nonequilibrium carbon nanostructures are formed, thereby the characteristics, properties of the colloidal solution are determined. The typical time of the discharge channel cooling is few microseconds, tens of microseconds. The dynamics of heating and cooling of the plasma channel significantly affects the parameters of the nanoparticles.

The specific energy deposition in the processed liquid is essential for producing the colloidal solution. In the absence of the continuous flow mode, the specific energy deposition γ is determined as follows:

$$\gamma = \frac{W \cdot f \cdot t}{V},$$

W is the single pulse energy deposition, f is the repetition frequency of the pulse, V is the liquid volume, t is the time of the liquid processing.

In the case of a continuous flow mode:

$$\lambda = \frac{W \cdot f}{U},$$

U is the flow rate per time unit (cm$^3$/s). As the time of the liquid processing (the specific energy deposition) increases, the liquid darkens as a result of formation of the carbon nanoparticles, and when the certain threshold value of the specific energy deposition is exceeded, the stable colloidal solution is formed (it does not precipitate for more than one year). At lower values of the specific energy deposition carbon precipitates at the bottom of the vessel in 1-2 days, the liquid becomes clarified.

The parameters of the nanoparticles were studied by different methods: RS (Raman scattering), DLS (dynamic light scattering), X-ray diffraction, electron microscopy, elemental formulation, etc.

We note that when the colloidal solution is heated to a temperature close to the boiling point and then cooled, the solution remains stable. The threshold of the specific energy deposition depends on the electrode material.

The elemental formulation of the nanoparticle powder obtained by evaporation of the colloidal solution is as follows: C 79.05%; O 19.57%, other detected elements are Si; K; Ti; Cr; Fe. The oxygen appears as result of its absorption from the air.

INDUSTRIAL APPLICABILITY

The results can be used for different applications, in particular, to produce a carbon film to coat a metal in order to reduce the coefficient of secondary electron emission, in the technology of growing diamond films and glasses, in production of elements absorbing solar radiation, etc.

The invention claimed is:

1. A method for producing a stable colloidal solution of nanoscale carbon, that the method comprising:
   feeding an organic liquid into a chamber containing a multi-electrode discharge device having an inter-electrode space, the organic liquid fully covering the multi-electrode discharge device;
   injecting an inert gas into the inter-electrode space of the multi-electrode discharge device;
   forming a high temperature plasma channel that atomizes molecules of the organic liquid by applying a high voltage pulse to the multi-electrode device; and
   rapidly cooling the atomized molecules,
   wherein the high voltage pulse has a predefined pulse repetition frequency which is less than or equal to 100 Hz.

2. The method of claim 1, wherein the stable colloidal solution is formed when a specific energy deposition in the liquid exceeds a threshold value.

3. The method of claim 2, wherein the organic liquid is ethanol.

4. The method of claim 1, wherein the organic liquid is ethanol.

* * * * *